(12) United States Patent
Behravan et al.

(10) Patent No.: US 10,142,069 B2
(45) Date of Patent: Nov. 27, 2018

(54) NETWORK NODE AND A METHOD THEREIN; A POSITIONING NODE AND A METHOD THEREIN; A USER EQUIPMENT AND A METHOD THEREIN, FOR HANDLING TRANSMISSION OF A REFERENCE SIGNAL

(71) Applicant: Telefonaktiebolaget LM Ericsson (publ), Stockholm (SE)

(72) Inventors: Ali Behravan, Stockholm (SE); Erik Eriksson, Linköping (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 295 days.

(21) Appl. No.: 15/027,851

(22) PCT Filed: Nov. 6, 2013

(86) PCT No.: PCT/SE2013/051304
§ 371 (c)(1),
(2) Date: Apr. 7, 2016

(87) PCT Pub. No.: WO2015/053674
PCT Pub. Date: Apr. 16, 2015

(65) Prior Publication Data
US 2016/0248563 A1  Aug. 25, 2016

(30) Foreign Application Priority Data
Oct. 11, 2013 (EP) .................................... 13188338

(51) Int. Cl.
*H04L 5/00* (2006.01)
*H04L 5/14* (2006.01)
(Continued)

(52) U.S. Cl.
CPC .......... *H04L 5/0048* (2013.01); *H04L 5/0087* (2013.01); *H04L 5/0092* (2013.01);
(Continued)

(58) Field of Classification Search
CPC ... H04L 5/0048; H04L 5/0087; H04L 5/0092; H04L 5/14; H04L 5/1469; H04W 72/085; H04W 64/00
(Continued)

(56) References Cited

U.S. PATENT DOCUMENTS

2010/0317343 A1* 12/2010 Krishnamurthy ......... G01S 1/30
455/435.1
2011/0205914 A1* 8/2011 Krishnamurthy ..... G01S 5/0221
370/252
(Continued)

FOREIGN PATENT DOCUMENTS

WO  2010049587 A1  5/2010
WO  2010107356 A1  9/2010

OTHER PUBLICATIONS

3GPP, "3rd Generation Partnership Project; Technical Specification Group Radio Access Network; Evolved Universal Terrestrial Radio Access (E-UTRA); Physical Channels and Modulation (Release 11)", 3GPP TS 36.211 V11.3.0, Jun. 2013, 1-108.
(Continued)

*Primary Examiner* — Chi Tang P Cheng
(74) *Attorney, Agent, or Firm* — Sage Patent Group

(57) ABSTRACT

The present embodiments relate to a network node (90), a method thereof; a positioning node (100), a method thereof; a UE (110) and a method thereof, for handling transmission of a reference signal and/or a reference signal configuration. The method in the network node (90) comprises: determining a transmission configuration for use in a cell served by the network node; if at least one subframe containing said
(Continued)

reference signal is also configured as a flexible subframe, comparing at least one parameter related to the transmission configuration with a threshold, and deciding based on the result of said comparison whether to operate the at least one subframe as a flexible subframe or as a downlink subframe.

22 Claims, 11 Drawing Sheets

(51) Int. Cl.
*H04W 72/08* (2009.01)
*H04W 64/00* (2009.01)

(52) U.S. Cl.
CPC ............. *H04L 5/14* (2013.01); *H04L 5/1469* (2013.01); *H04W 72/085* (2013.01); *H04W 64/00* (2013.01)

(58) Field of Classification Search
USPC ........................................................ 370/329
See application file for complete search history.

(56) References Cited

U.S. PATENT DOCUMENTS

| | | | |
|---|---|---|---|
| 2013/0294402 A1* | 11/2013 | Yoon | H04W 64/00 370/330 |
| 2015/0245346 A1* | 8/2015 | Yokomakura | H04W 24/10 370/329 |
| 2016/0205690 A1* | 7/2016 | Berggren | H04L 5/001 370/280 |

OTHER PUBLICATIONS

Unknown Author, "CRS Handling in Flexible Subframes", 3GPP TSG RAN WG1 #74bis, R1-134158, Samsung, Guangzhou, China, Oct. 7-11, 2013, 1-5.

Unknown Author, "New Work Item Proposal for Further Enhancements to LTE TDD for DL-UL Interference Management and Traffic Adaptation", 3GPP TSG-RAN Meeting #58, RP-121772, Barcelona, Spain, Feature, Core, & Performance Part, Dec. 4-7, 2012, 1-15.

Unknown Author, "Other Aspects for TDD eIMTA", 3GPP TSG RAN WG1 Meeting #73, R1-131885, Catt, Fukuoka, Japan, May 20-24, 2013, 1-3.

* cited by examiner

NETWORK NODE AND A METHOD THEREIN; A POSITIONING NODE AND A METHOD THEREIN; A USER EQUIPMENT AND A METHOD THEREIN, FOR HANDLING TRANSMISSION OF A REFERENCE SIGNAL

TECHNICAL FIELD

Embodiments herein relate to network node and a method therein; a positioning node and a method therein; a user equipment and a method therein, for handling transmission of a reference signal.

BACKGROUND

In a dynamic Time Division Duplex (TDD) system, a group of subframes are fixed subframes, i.e. they are either uplink or downlink subframes in all radio frames, while others are flexible subframes, i.e. in some radio frames they can be UpLink (UL) subframes while in other radio frames same subframe can be DownLink (DL) subframes. The assignment of the UL or DL direction may be performed in a dynamic manner. A flexible subframe when used as DL or UL subframe may contain only user specific data e.g. Physical DL Shared Channel (PDSCH) and/or Physical UL Shared Channel (PUSCH) and associated control information e.g. DeModulation Reference Signal (DMRS) in DL, Sounding Reference Signal (SRS) in UL etc. This means that a flexible subframe in DL may not even contain signals like Cell-specific Reference Signal (CRS), Positioning Reference Signal (PRS) etc. The PRS may be transmitted occasionally (e.g. once with a periodicity of 160 ms, 320 ms, 6400 ms or 1280 ms). The subframe containing PRS are interchangeably called as a PRS subframe. Due to the use of flexible subframes, the transmission of all desired number of PRS subframes cannot be consistently guaranteed. This in turn will degrade the positioning performance of e.g. the Observed Time Difference Of Arrival (OTDOA) which relies on PRS based User Equipment (UE) positioning measurements used for finding UE location under e.g. emergency services. Therefore under dynamic TDD the regulatory requirements may not be met. More details on dynamic TDD and positioning and the different types of subframes will be described in greater detail in the detailed description of this application.

Also, when a PRS used for OTDOA instant coincides with a flexible subframe, it may not be guaranteed that the PRS can be sent in that subframe. Therefore some PRS subframe may be unavailable for Reference Signal Time Difference (RSTD) measurement.

In OTDOA the RSTD is used for finding UE position under emergency services. Regulators require that UE location is determined within a certain delay and the location should be accurate within a certain range e.g. ±50 m. The regulatory requirements may vary depending upon region or country. The delay depends upon the RSTD measurement time and positioning accuracy depends upon RSTD measurement accuracy. The typical RSTD measurement accuracy can be e.g. ±5 Ts, where 1 Ts=32.5 ns. The RSTD measurement requirements (e.g. RSTD measurement period, RSTD measurement accuracy etc.) in turn depends upon one or more PRS configuration parameters e.g. PRS periodicity, PRS subframes per PRS occasion, PRS muting pattern, PRS bandwidth etc. For example the RSTD measurement time increases with the increase in PRS periodicity. In existing solutions without dynamic TDD the RSTD measurement time for different PRS configuration parameters are within an acceptable limit specified by regulators.

A UE receives PRS configuration and information about flexible subframes for the same cells from a positioning node and/or a network node (e.g. serving eNode B or eNB). This is shown in FIG. 1 showing reception by a UE of PRS configuration and flexible subframe information from a positioning node and a network node respectively. The eNB may transmit the configuration via Radio Resource Control signalling (RRC) as shown in FIG. 1.

A UE expects a PRS in subframes according to the PRS configuration sent to the UE by the positioning node in the OTDOA assistance information. The two sets of information from positioning and network nodes may however be conflicting in the existing system since no solution exists to address this. For example a positioning node may indicate certain subframes (e.g. subframe #3) as the valid PRS subframe(s) to be used for positioning measurements. However due to the nature of dynamic TDD, a network node may decide to use the same subframe (e.g. subframe #3) as flexible subframe and inform the UE about this. Hence they may collide.

A flexible subframe even in DL may not contain PRS. This will have severe consequences on the positioning measurement performance. For example the UE may receive an inadequate number of PRS subframes to meet a desired accuracy. The UE may also perform measurements on signals in inappropriate subframes which don't actually contain PRS. This will results in longer measurement time i.e. delay; e.g. fewer available PRS subframes and/or degraded measurement accuracy e.g. measuring on incorrect signals. In both cases the desired positioning accuracy based on OTDOA measurements will not be fulfilled. Since OTDOA is used for emergency services a degraded accuracy is not considered acceptable by the regulatory requirements.

SUMMARY

An object of embodiments herein is to provide a method network node and a method therein; a positioning node and a method therein; a user equipment and a method therein, for handling transmission of a PRS and/or PRS configuration in a subframe in a TDD based network.

Thus, according to an aspect of embodiments herein, there is provided a method performed in a network node, of transmitting a PRS in at least one downlink subframe and operating one or more flexible subframes, whose direction may dynamically change in a cell operating on a TDD carrier. the method comprises determining PRS transmission configuration and flexible subframe configuration for use in a cell served by a network node; If at least one subframe containing PRS is also configured as a flexible subframe then comparing at least one parameter related to PRS transmission configuration with a threshold; Deciding based on the result of said comparison whether to operate the at least one subframe as flexible subframe or only as downlink subframe containing PRS transmission. The network node taking the decision may be seen as a central node or controller node or a central processing unit and it may be a radio base station (or NodeB) being a macro base station or it may be a Low Power Node LPN or it may be a RNC or any suitable network implementing the method herein in accordance with the embodiments described here. Additional embodiments will be described in the detailed description.

According to another aspect of embodiments herein, there is provided a network node configured to perform the method above and to further perform additional method steps as will be described. Hence the network node comprises means and/or circuitry and/or modules and/or processing units/circuits and t configured to perform the above.

According to another aspect of embodiments herein, there is provided a method performed in or by a position/positioning node capable in transmitting to a UE information about PRS configuration for one or a plurality of cells operating on a TDD carrier, thereby enabling the UE to perform one or more positioning measurements. The method comprises: Obtaining/receiving/acquiring from a UE a PRS configuration in one or more plurality of cells; wherein a cell is served by a network node; Obtaining/receiving/acquiring information from one or more network nodes about one or more flexible subframe(s) used in the one or plurality of cells; If at least one subframe containing PRS is also configured as a flexible subframe then comparing at least one parameter related to PRS transmission configuration with a threshold, deciding based on the result of said comparison whether to include the subframe(s) configured as the flexible subframe as well as PRS subframe in the PRS configuration or not; and transmitting a PRS configuration information to the UE.

According to another aspect of embodiments herein, there is provided a positioning node configured to perform the method above and to further perform additional method steps as will be described. Hence the positioning node comprises means and/or circuitry and/or modules and/or processing units/circuits and t configured to perform the above.

According to another aspect of embodiments herein, there is provided a method performed in or by a UE of performing positioning measurements on PRS transmitted by plurality of cells operating on a TDD carrier, the method comprises: Obtaining/receiving/acquiring from a positioning node a PRS configuration of PRS transmitted in plurality of cells for performing positioning measurements; Obtaining/receiving/acquiring from a network node information about flexible subframe(s), whose direction may change dynamically in a TDD based network, is/are used in one or more cells; if at least one subframe containing PRS in at least one of the plurality of cells is also configured as a flexible subframe then comparing at least one parameter related to the PRS transmission configuration with a threshold in the said cell served by a network node; determining based on the result of said comparison whether to treat the at least one subframe as flexible subframe or only as downlink subframe containing PRS transmission; and performing positioning measurements based on the determination.

According to another aspect of embodiments herein, there is provided a UE configured to perform the method above and to further perform additional method steps as will be described. Hence the UE comprises means and/or circuitry and/or modules and/or processing units/circuits and t configured to perform the above.

An advantage achieved by the embodiments herein is to reduce the delay in determining the positioning of the UE. Another advantage is to improve or avoid reducing the positioning accuracy based on e.g. OTDOA measurements.

Hence an advantage with the described embodiments is to ensure consistent positioning measurement results and well defined measurement requirements when flexible subframes are used on cells on which positioning measurement is done. The methods described herein ensure that the UE positioning performance (i.e. measurement time and measurement accuracy) is not degraded when flexible subframes are used on cells. Further the methods ensure that all nodes (UE, network node and positioning node) are aware of common configuration of PRS transmissions which are used for positioning measurements by the UE. Further the methods also ensure that the dynamic TDD operation is maintained under certain PRS configuration settings. In addition and as described above, the regulatory requirements related to the emergency services relying on OTDOA based positioning are met.

DETAILED DESCRIPTION

The network wherein the embodiments herein are applied may use access technologies such as Long Term Evolution), LTE-Advanced, Wideband Code Division Multiple Access (WCDMA), High Speed Packet Access (HSPA) Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Although the terminology from Third Generation Partnership Project (3GPP) LTE is used in this disclosure to exemplify the different embodiments, this should not be seen as limiting the scope of the embodiments to only the aforementioned system. Other wireless systems, including WCDMA, UTRA FDD, UTRA TDD, WiMax, WLAN, UMB and GSM/GERAN/EDGE, may also benefit from exploiting the ideas covered within this disclosure.

Also note that terminology such as eNodeB and UE should be considering non-limiting and does in particular not imply a certain hierarchical relation between the two; in general "eNodeB or eNB" could be considered as device 1 and "UE" device 2, and these two devices communicate with each other over some radio channel. Herein, we also focus on wireless transmissions in the downlink, but the invention is equally applicable in the uplink. In addition a positioning node may be any suitable node capable to implement the embodiments described herein. Such positioning node may be connected to the network node via an interface, wirelessly or via wire line. Also, the positioning node be an integral part of the network node or any other network node, or implemented in software and/or in hardware.

As mentioned in the background section, details on dynamic TDD and positioning and the different types of subframes will be described in greater detail in this detailed description of this application.

In cellular TDD based systems, in order to serve users according to traffic needs, different uplink/downlink (UL/DL) configurations may be required in different cells. This is being discussed under a work item in 3GPP [1]. TDD systems with flexible UL/DL allow for an adaptation of the amount of UL and DL data to be transmitted, by adapting the time slots or subframes allocated to each transmission direction (UL or DL). This is a simple and powerful method for balancing the network to the current need of its users.

Figure 1:
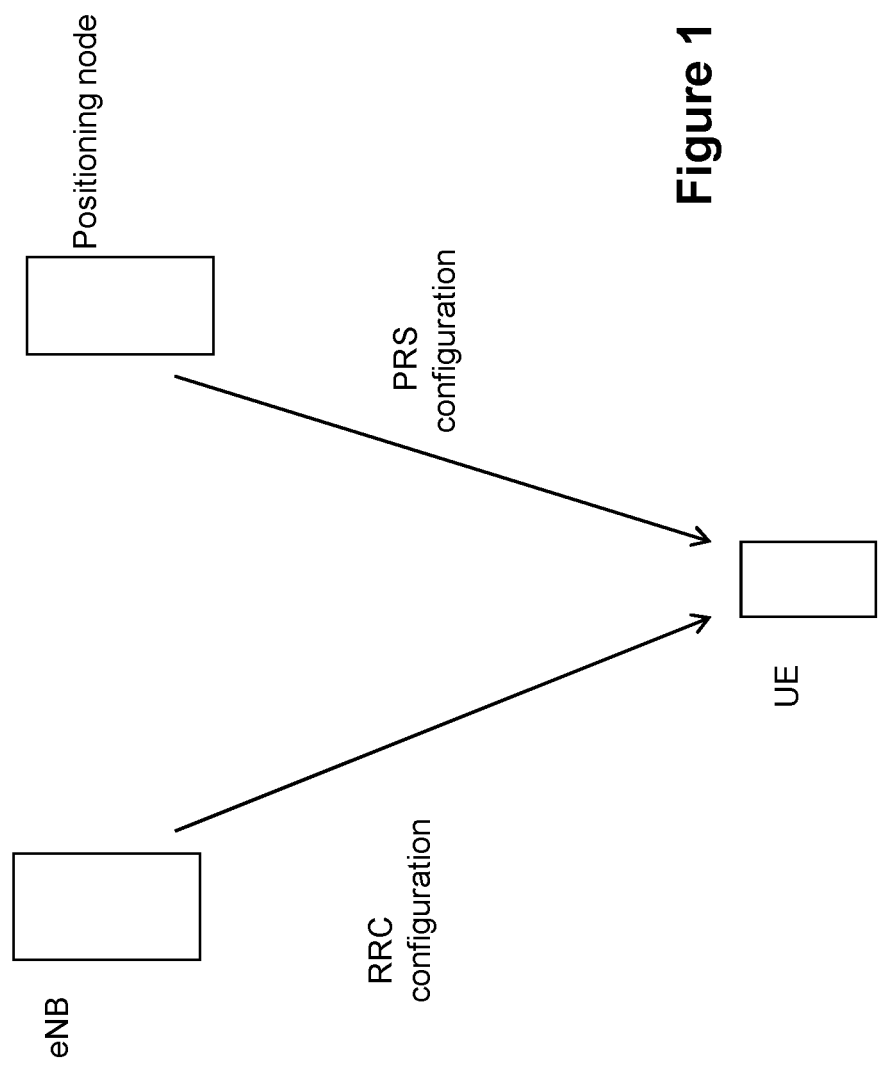
FIG. 1 is a diagram illustrating an example of a network comprising a network node, a positioning node and a UE wherein the embodiments herein may be applied.
Figure 2:
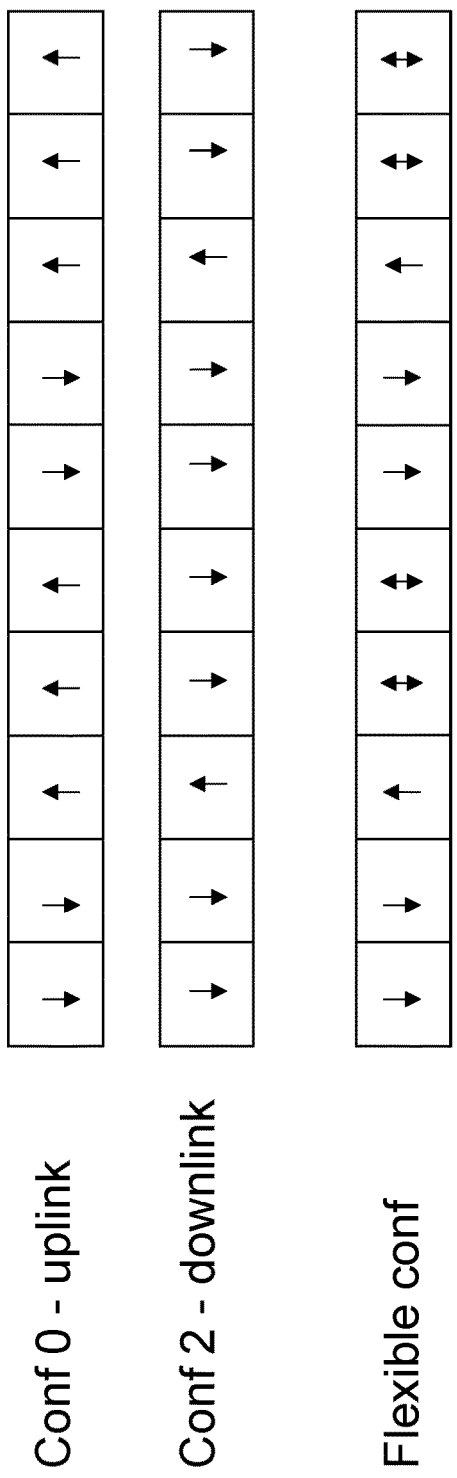
FIG. 2 shows an exemplary dynamic TDD configuration.

FIG. 2 shows as an example a dynamic TDD configuration (Conf 0 for UL; Conf 2 for DL and Flexible configuration) made from two legacy TDD configurations. Arrows are representing either DL direction or UL direction. E.g. for UL direction an arrow is pointing up and for DL direction, an arrow is pointing down; or vice versa.

A flexible subframe is configured in a cell served by a network node and the UEs are also informed about the flexible subframes by means of signaling. A subframe is in this document referred to as flexible if it is an uplink subframe in one TDD configuration and a downlink subframe in a second TDD configuration. The two configurations may either be the configuration used for uplink scheduling and HARQ timing and the configuration used for downlink HARQ timing. It may otherwise be based on fixed configurations, e.g. configuration 0 and 5. In this example would subframes {3, 4, 7, 8, 9} be flexible.

Several positioning methods for determining the location of the target device, which may be any of the wireless device or UE, mobile relay, PDA etc. exist. The position of the target device may be determined by using one or more positioning measurements, which may be performed by a suitable measuring node or device. Depending upon the positioning the measuring node may either be the target device itself, a separate radio node (i.e. a standalone node), serving and/or neighboring node of the target device etc. Also depending upon the positioning method the measurements may be performed by one or more types of measuring nodes. The well-known positioning methods are:

1. Satellite based methods: In this case the measurements performed by the target device on signals received from the navigational satellites are used for determining target device's location. For example either GNSS or A-GNSS (e.g. A-GPS, Galileo, COMPASS, GANSS etc) measurements are used for determining the UE position.
2. OTDOA: This method uses UE measurement related to time difference of arrival of signals from radio nodes (e.g. UE RSTD measurement) for determining UE position in LTE or SFN-SFN type 2 in HSPA.
3. UTDOA: It uses measurements done at a measuring node (e.g. LMU) on signals transmitted by a UE. The LMU measurement is used for determining the UE position.
4. Enhanced cell ID: It uses one or more of measurements for determining the UE position e.g. any combination of UE Rx-Tx time difference, BS Rx-Tx time difference, timing advanced (TA) measured by the BS, LTE RSRP/RSRQ, HSPA CPICH measurements (CPICH RSCP/Ec/No), angle of arrival (AoA) measured by the BS on UE transmitted signals etc for determining UE position. The TA measurement is done using use either UE Rx-Tx time difference or BS Rx-Tx time difference or both.
5. Hybrid methods: It relies on measurements obtained using more than one positioning method for determining the UE position In LTE the positioning node (aka E-SMLC or location server) configures the UE, eNode B or LMU to perform one or more positioning measurements depending upon the positioning method. The positioning measurements are used by the UE or by a measuring node or by the positioning node to determine the UE location. In LTE the positioning node communicates with UE using LPP protocol and with eNode B using LPPa protocol.

Figure 3:
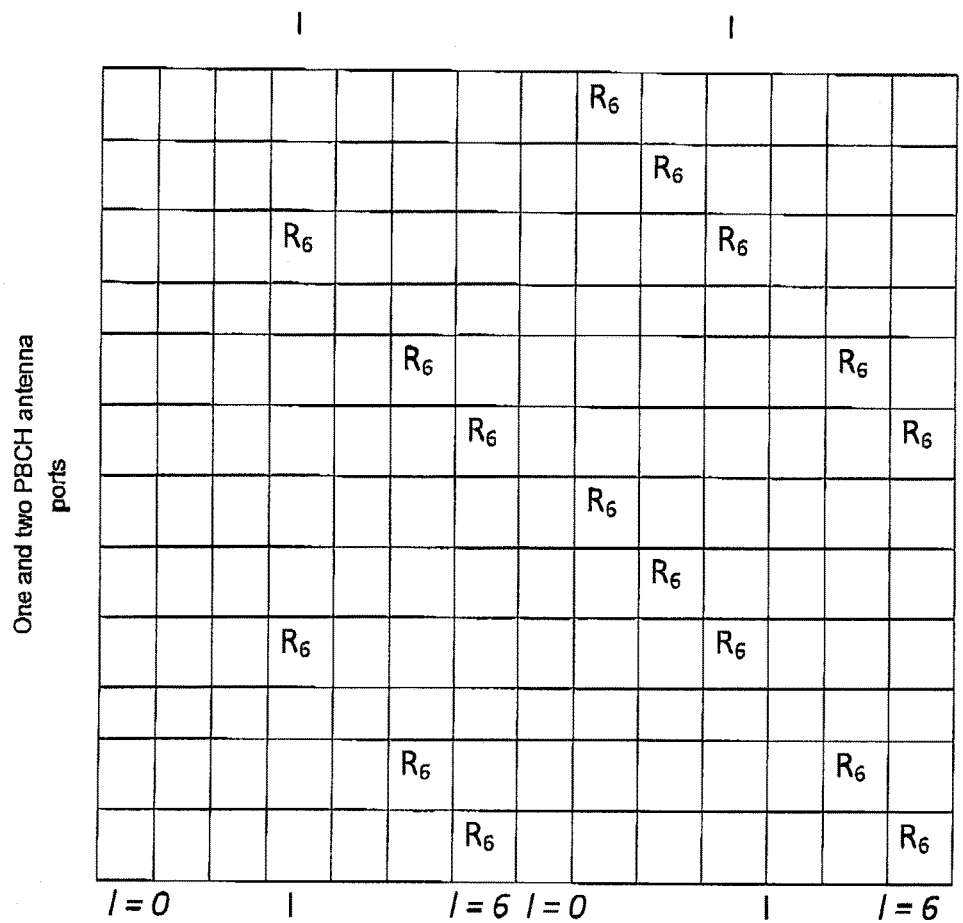
FIG. 3 depicts an example of a PRS transmission in a subframe.

In LTE Release 9, special positioning subframes are devised to improve OTDOA positioning performance. These positioning subframes typically do not contain any data and only carry positioning reference signals together with CRS. However data transmission may also take place in these subframes. Positioning reference signals are transmitted by the base station or network node in a number of consecutive downlink subframes, where this number is configured at the UE by higher layers. The PRS transmission may take place over antenna port #6 (aka $R_6$) and is shown in FIG. 3. FIG. 2 shows one and two PBCH antenna ports and R6 placement in a subframe.

Figure 4:
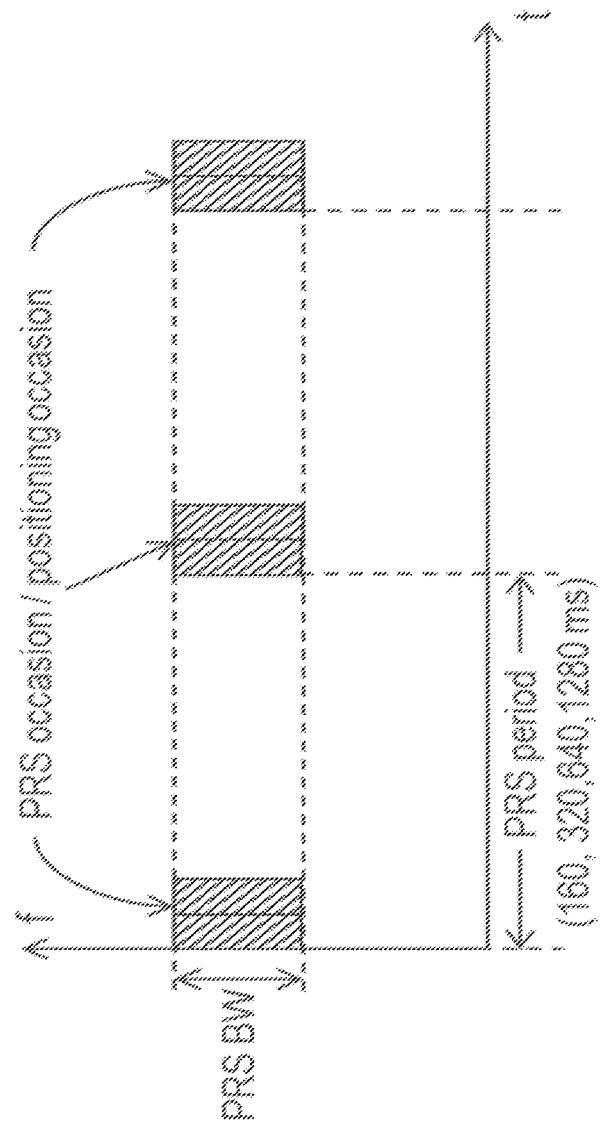
FIG. 4 is an example of PRS occasion containing 2 PRS subframes occurring with a certain periodicity.

A set of consecutive DL subframes containing PRS is also called as positioning occasion or simply PRS occasion. The DL subframe containing PRS is also interchangeably called as PRS subframe. Within a positioning occasion any number of PRS subframes ranging from 1 to 6 can be configured. There are 4 different PRS periodicities or more specifically PRS occasion periodicity. They are 160 ms, 320 ms, 640 ms, and 1280 ms [2]. The PRS periodicity is also interchangeably called as positioning configuration period, PRS period or PRS configuration period. In frequency domain the PRS are transmitted over the BW equal to or less than the BW of the cell. The PRS BW (aka PRS transmission BW) can be any of: 6, 15, 25, 50, 75 and 100 RBs. In order to reduce interference at the UE for receiving PRS from another cell (e.g. cell2), the PRS in one or more PRS occasions in a cell (e.g. cell1) can be muted (i.e. not transmitted or transmitted with low or reduced power). For example all PRS subframes in every $4^{th}$ PRS occasion can be muted or 2 out of 8 PRS occasions can be muted; the corresponding muting pattern is signaled to the UE by the positioning node. These parameters (aka PRS configuration parameters) are illustrated in FIG. 4. The following definitions are used herein regarding the type of subframes:

Fixed subframe: In some embodiments the term "fixed subframe" is used which refers to a subframe whose direction is remains the same (i.e. either UL or DL) as indicated in the message containing the TDD configuration (aka UL-DL configuration). E.g. subframes with the same link direction in both the configuration used for uplink HARQ timing and the configuration used for downlink HARQ timing.

Flexible subframe: In some embodiments the term "flexible subframe" is used which refers to a subframe whose direction can dynamically change between UL and DL over time e.g. between frames. E.g. subframes with different link direction in the configuration used for uplink HARQ timing and the configuration used for downlink HARQ timing.

Flexible DL subframe: In some embodiments the term "flexible DL subframe" is used which refers to a flexible subframe that is assigned to be a DL subframe by the network node.

Flexible UL subframe: In some embodiments the term "flexible UL subframe" is used which refers to a flexible subframe that is assigned to be a UL subframe by the network node.

Figure 6:
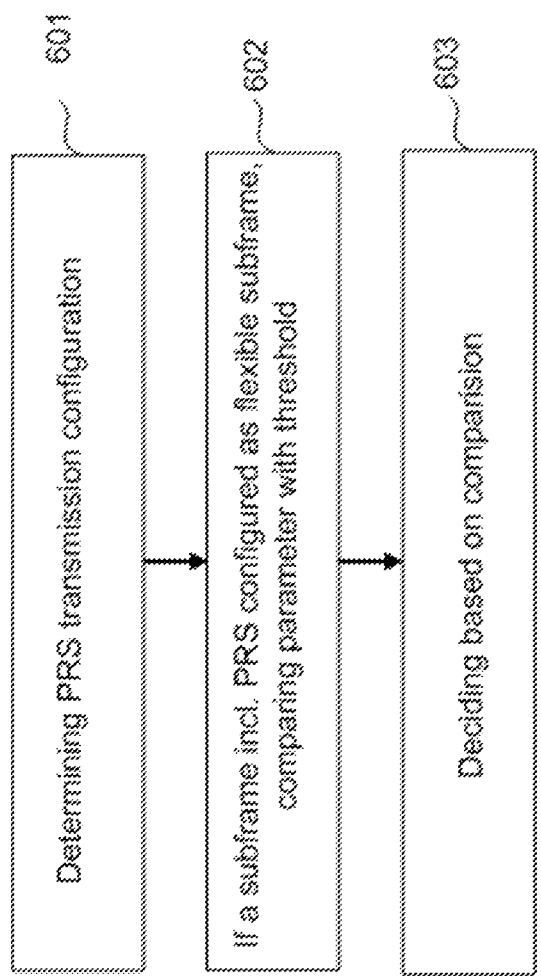
FIG. 6 illustrates a method in a network node in accordance with some exemplary embodiments herein.

Before describing exemplary embodiments of the present technology the main steps of the method performed by a network node first presented in conjunction with FIG. 6.

As shown the main steps comprise:
(601) determining PRS transmission configuration and flexible subframe configuration for use in a cell served by a network node; If at least one subframe containing PRS is also configured as a flexible subframe then
(602) comparing at least one parameter related to PRS transmission configuration with a threshold;
(603) Deciding based on the result of said comparison whether to operate the at least one subframe as flexible subframe or only as downlink subframe containing PRS transmission. The network node taking the decision may be seen as a central node or controller node or a central processing unit and it may be a radio base station (or NodeB) being a macro base station or it may be a Low Power Node LPN or it may be a RNC or any suitable network implementing the method herein in accordance with the embodiments described here.

The network node is configured to adapt flexible subframe operation to assist positioning determination.

The network node such as base station is configured to transmit PRS according to certain configuration which is pre-defined or configured by another network node e.g. OSS, O&M, SON etc. The PRS configuration information, which is cell specific and comprises of one or more parameters such as PRS occasion periodicity, number of PRS subframes in a positioning occasion, PRS BW, transmit power of PRS, PRS muting configuration etc., may be sent to the UE by the positioning node (or network node) as part of OTDOA assistance information enabling the UE to perform OTDOA positioning measurements e.g. RSTD.

Figure 5:
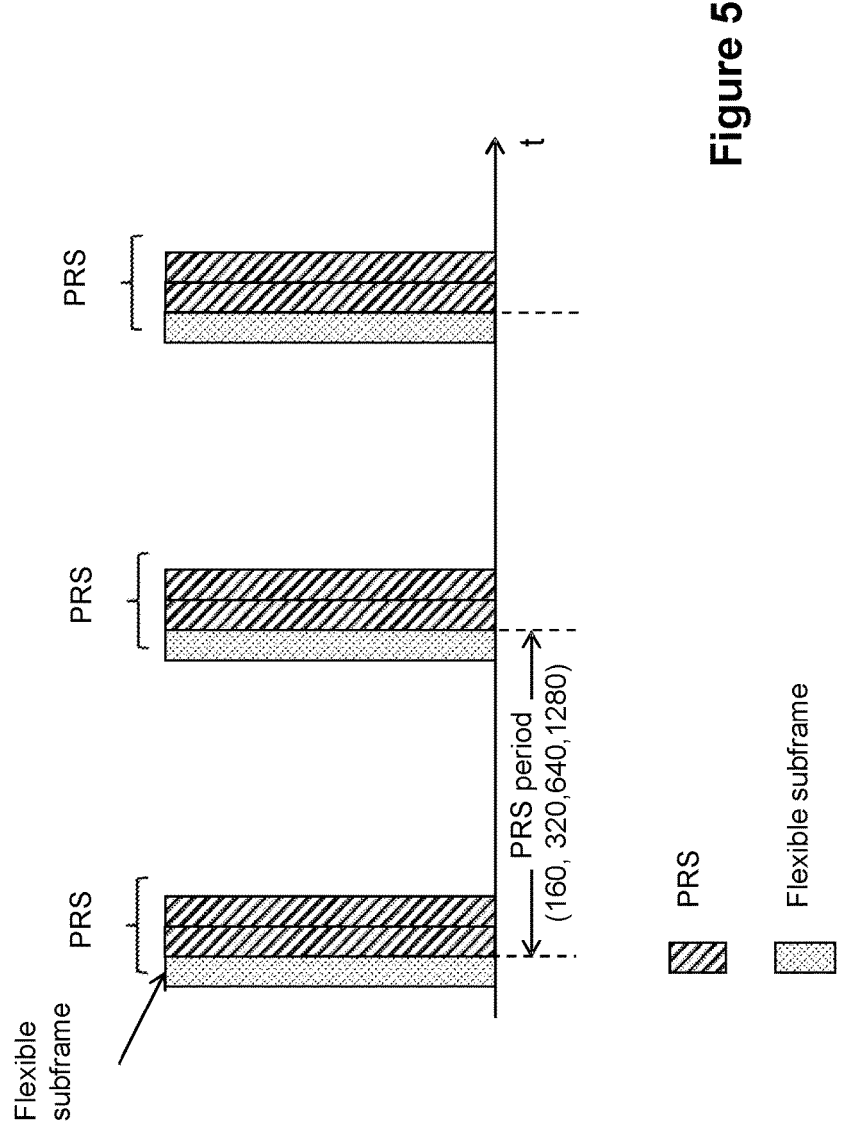
FIG. 5 shows flexible subframes and PRS subframes in a cell on a TDD carrier.

The network node may also employ dynamic TDD on a TDD carrier in a cell. Therefore network node transmitting PRS in one or more DL subframes may also decide use one or more subframes as flexible subframe. The configuration of flexible subframe and PRS subframes in the same cell is shown in FIG. 5 where flexible subframe is adjacent to a PRS subframe. The periodicity is also illustrated.

In order to ensure that the OTDOA positioning performance is maintained within an acceptable limit when dynamic TDD is used, the network node applies one or more pre-defined rules (elaborated below) to transmit adequate number of PRS subframes to the UE in one or more cells. According to some exemplary embodiments, the network node is configured to obtain information about the PRS configuration of PRS to be transmitted in one or more cells on at least one TDD carrier. One network node may operate multiple cells on the same or TDD different carriers. The network node obtains this information from another node e.g. O&M, OSS, SON etc. Alternatively the network node may have stored information about the PRS configuration to be used in one or more cells on TDD carrier. The network node also is configured to obtain information about one or more flexible subframes to be used on one or more cells on the TDD carrier. The network node may obtain this information by one or more means such as from scheduler that schedules radio resources (e.g. resource blocks, subframes etc.) for UL and DL transmissions to the UE, based on request from another node such as SON etc. The network node is further configured to determine whether any of the PRS subframe is also intended to be configured as a flexible frame in any one or more cells. The network node is further configured to perform the above whenever any of the obtained information described above is modified;

If one or more PRS subframes are also configured as flexible subframes then the network node is configured to compare one or more parameters in PRS configurations with their respective thresholds, and based on the comparison the network node is configured to decide whether to operate the subframe configured as both PRS and flexible subframe as flexible subframe or as PRS subframe (i.e. only DL subframe containing at least PRS). The non-limiting examples of comparing steps, which can be specified as pre-defined rules are given below:

If PRS periodicity is above a threshold (e.g. 320 ms) in a cell the network node is configured to operate the subframe as PRS subframe otherwise as a flexible subframe in the cell. This is because with longer PRS periodicity the RSTD measurement time also becomes longer and therefore it is more critical that PRS subframes are not lost.

If the number of PRS subframes in a PRS occasion in a cell is below a threshold (e.g. 3) then the network node is configured to operate the subframe as PRS subframe otherwise as a flexible subframe in the cell. This is because with fewer PRS subframes the RSTD measurement accuracy becomes worse and therefore it is more critical that PRS subframes are not lost when PRS occasion contains fewer PRS subframes. If the PRS bandwidth in a cell is below a threshold (e.g. 25 Resource Blocks) then operate the subframe as PRS subframe otherwise as a flexible subframe in the cell. This is because smaller PRS bandwidth leads to worse RSTD measurement accuracy and therefore it is more critical that PRS subframes are not lost when PRS bandwidth is smaller;

If the PRS muting is applied (e.g. one or more PRS occasions are muted over certain time period) then the network node is configured to operate the subframe as PRS subframe otherwise as a flexible subframe in the cell. PRS muting is applied on a cell to reduce interference at the UE when it receives PRS signals from another cell. The PRS muting leads to long RSTD measurement time and therefore it is more critical that PRS subframes are not lost when PRS muting is applied;

The above pre-defined rule further depends upon the PRS muting pattern (e.g. number of PRS muting occasions over certain number of PRS occasions). For example if the PRS muting density is above a threshold (e.g. 50% or more of PRS occasions are muted; such as 4 out of 8 PRS occasions are muted) in a cell then operate the subframe as PRS subframe otherwise as a flexible subframe in the cell.

Depending upon the outcome of the comparison the network node is configured operates the subframe (i.e. which was identified as to be configured as both PRS and flexible subframe) either as flexible subframe or PRS subframe in the cell;

The network node may further be configured to adjust one or more PRS configuration parameters to further enhance the availability of PRS subframes to the UE.

For example the network node may change the PRS periodicity e.g. shorten the periodicity to enable UE to receive PRS subframes more often, increase the number of PRS subframes per PRS occasion, reduce the number of PRS muting occasions over certain number of PRS occasions, shift the PRS occasion in time such that PRS subframes and flexible subframes don't occur at the same time or their simultaneous occurrence is reduced etc.

The network node may also be configured to inform about the decision or statistics to the UE or to other network nodes e.g. neighboring base stations, O&M, OSS, SON, positioning node etc. Other network node may also use this information to align its PRS configuration with the PRS configuration in its neighbouring network nodes.

Figure 7:
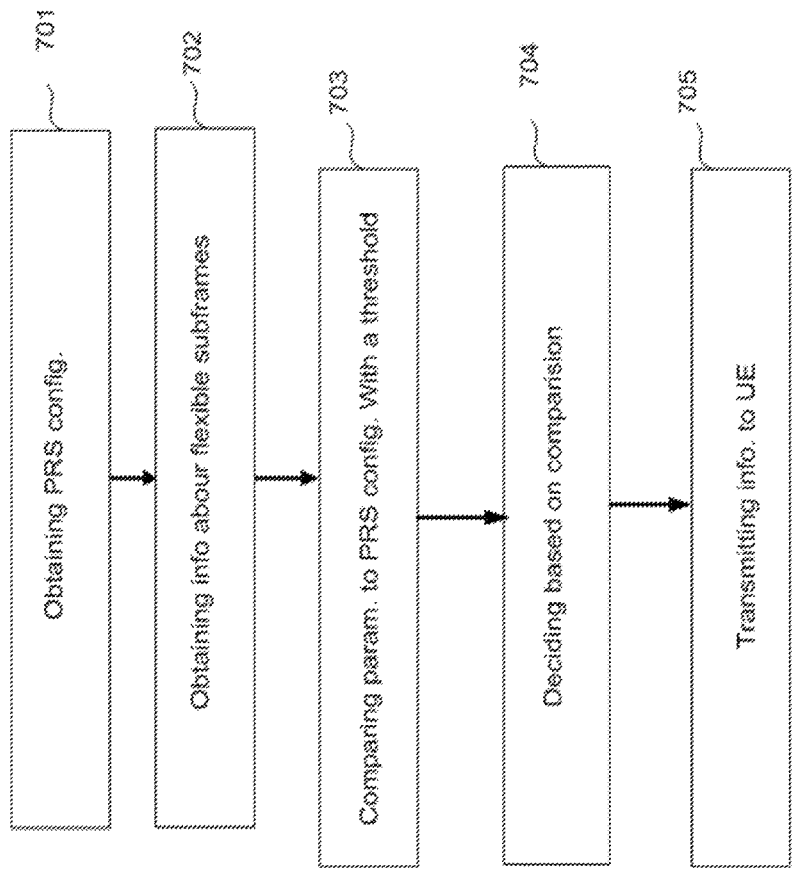
FIG. 7 illustrates a method in a positioning node in accordance with some exemplary embodiments herein.

The main steps of the method performed by a positioning node are presented in conjunction with FIG. 7. The position/positioning node is configured to transmit to a UE information about PRS configuration for one or a plurality of cells operating on a TDD carrier, thereby enabling the UE to perform one or more positioning measurements.

As shown the method comprises:
- (701) Obtaining/receiving/acquiring from a UE a PRS configuration in one or more plurality of cells; wherein a cell is served by a network node;
- (702) Obtaining/receiving/acquiring information from one or more network nodes about one or more flexible subframe(s) used in the one or plurality of cells; If at least one subframe containing PRS is also configured as a flexible subframe then
- (703) comparing at least one parameter related to PRS transmission configuration with a threshold,
- (704) deciding based on the result of said comparison whether to include the subframe(s) configured as the flexible subframe as well as PRS subframe in the PRS configuration or not; and
- (705) transmitting a PRS configuration information to the UE.

Figure 8:
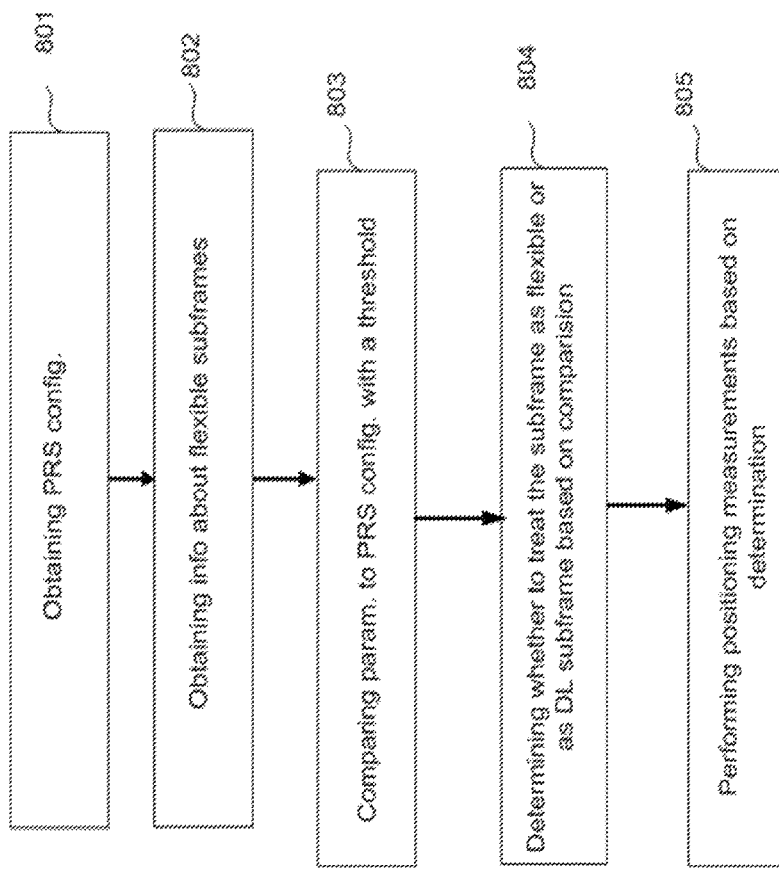
FIG. 8 illustrates a method in a UE in accordance with some exemplary embodiments herein.

The positioning node is hence configured to adapt parameters related to PRS configuration, as stated earlier, as part of the OTDOA assistance data (aka OTDOA assistance information) based on one or more pre-defined rules (explained below) or indication received from another network node. For example, the positioning node is configured to perform as follows:

1. The positioning node is configured to obtain information about the PRS configuration of PRS to be transmitted in one or more cells on at least one TDD carrier e.g. from another network node such as base station transmitting PRS, O&M, OSS, SON etc.;
2. The positioning node is configured to obtain information about the flexible subframes used in one or more cells from network node, UE or based on stored data, historical information (e.g. flexible subframes used recently) or pre-defined information (e.g. certain subframes can potentially be flexible subframes). The information may also comprise of an indication that certain subframes could be used as flexible subframe in certain cells or on all cells on certain TDD carrier;
3. The positioning node is configured to determine whether any of the PRS subframe is also intended to be configured as a flexible frame in any one or more cells. The positioning node performs this step before sending PRS configuration information to the UE or whenever any of the obtained information in step 1) or step 2) is modified;
4. The positioning node is configured to determine based on one or more pre-defined rules (same rules defined in step 4 in section 6.1), which of the subframes are actually operating as PRS subframes in one or more respective cells;
5. The positioning node is configured to transmit PRS configuration containing information about the determined actual PRS subframes in step 4) to the UE, enabling the UE to perform positioning measurements on the cells;
6. The method in the positioning node may further comprise of including PRS configuration of those cells which actually transmit PRS subframes per PRS occasion above a threshold;

The main steps of the method performed by a UE of performing positioning measurements on PRS transmitted by plurality of cells operating on a TDD carrier, the are described in conjunction with FIG. 8 and comprises:
- (801) Obtaining/receiving/acquiring from a positioning node a PRS configuration of PRS transmitted in plurality of cells for performing positioning measurements;
- (802) Obtaining/receiving/acquiring from a network node information about flexible subframe(s), whose direction may change dynamically in a TDD based network, is/are used in one or more cells; if at least one subframe containing PRS in at least one of the plurality of cells is also configured as a flexible subframe then
- (803) comparing at least one parameter related to the PRS transmission configuration with a threshold in the said cell served by a network node;
- (804) determining based on the result of said comparison whether to treat the at least one subframe as flexible subframe or only as downlink subframe containing PRS transmission; and
- (805) performing positioning measurements based on the determination.

The UE is not impacted in case the PRS configuration information sent by the positioning node to the UE already takes into account the actual PRS subframes being transmitted in one or more cells on a TDD carrier. However if the pre-defined rules described earlier are applied only by the network node and not by the positioning node then the UE also is configured to select the appropriate PRS subframes (i.e. subframes actually used as PRS subframes) for performing the OTDOA positioning measurements e.g. RSTD. The steps performed by the UE may be explained as follows 1. The UE is configured to obtain OTDOA assistance information from the positioning node information, which assistance information contains PRS configuration to be used by the UE for performing positioning measurements on one or more cells on one or more TDD carrier;
2. The UE is configured to obtain information about the flexible subframes used in one or more cells from the network node, blindly detected by the UE when performing radio measurements on cells (e.g. RSRP, RSRQ measurements), historical information (e.g. flexible subframes used recently) or pre-defined information (e.g. certain subframes are potentially flexible subframes);
3. The UE is configured to determine whether any of the PRS subframe in the received OTDOA assistance information is also intended to be configured as a flexible frame in any one or more cells. The performs this step when it receives information in step 1) or whenever any of the obtained information in step 1) or step 2) is modified;
4. The UE is configured to determine based on one or more pre-defined rules (same rules defined in step 4 in section 6.1), which of the subframes are actually operating as PRS subframes in one or more respective cells;
5. The UE based on the determining step 4) is configured to use only the subframes actually being transmitted as PRS subframe for performing the positioning measurement, and perform the said positioning measurement;
6. The UE further is configured to use the performed positioning measurement for determining its location and/or sends the positioning measurement results to the positioning node, which may use it for determining the UE location.

As previously disclosed the embodiments herein have many advantages which include: ensuring consistent positioning measurement results and well defined measurement requirements when flexible subframes are used on cells on which positioning measurement is done; ensuring that the UE positioning performance (i.e. measurement time and measurement accuracy) is not degraded when flexible subframes are used on cells; ensuring that all devices (UE, network node and positioning node) are aware of common configuration of PRS transmissions which are used for positioning measurements by the UE; ensuring that the dynamic TDD operation is also maintained under certain PRS configuration settings; and the regulatory requirements related to the emergency services relying on OTDOA based positioning are met.

It is worth mentioning that the accuracy of positioning measurements may be dependent on the number of subframes available for measurements. If PRS configurations are allowed in flexible subframes this would implicitly make the subframe downlink. This may be acceptable due to e.g. the long duty cycle of the PRS configuration that these subframes are excluded from traffic adaptation and instead are may be only used for downlink transmissions. However UEs users with and without eIMTA (enhancements for Interference Mitigation and Traffic Adaptation) configured would have different assumptions on if PRS is present or not in a specific subframe. Hence one proposal is to omit transmission of PRS in one or more flexible subframes.

Figure 9:
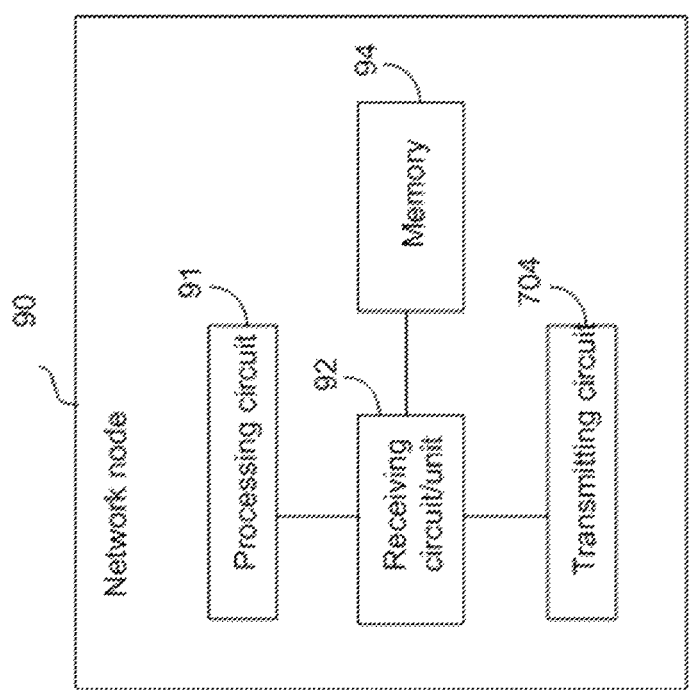
FIG. 9 illustrates a block diagram depicting a network node according to exemplary embodiments herein.

Referring to FIG. 9 there is illustrated a network node 90 for performing the method steps and embodiments described above in relation to the network node. The network node is configured to transmit a PRS in at least one downlink subframe and operating one or more flexible subframes, whose direction may dynamically change in a cell operating on a TDD carrier. The network node comprises a processing circuitry 91 configured to determine PRS transmission configuration and flexible subframe configuration for use in a cell served by a network node; If at least one subframe containing PRS is also configured as a flexible subframe then the processing circuitry is configured to compare at least one parameter related to PRS transmission configuration with a threshold; and to decide based on the result of said comparison whether to operate the at least one subframe as flexible subframe or only as downlink subframe containing PRS transmission. The network node taking the decision may be seen as a central node or controller node or a central processing unit and it may be a radio base station (or NodeB) being a macro base station or it may be a Low Power Node LPN or it may be a RNC or any suitable network implementing the method herein in accordance with the embodiments described here.

The network node comprises a receiver circuit or receiver circuit/unit 92; a transmitter circuit 93. The network node may further comprise a memory 94 for storing information.

It should be mentioned that the embodiments herein may be implemented through one or more processors or processing units e.g. processing circuit or unit of the network node together with a computer program code for performing the functions and/or method steps of the embodiments. The program code mentioned above may also be provided as a computer program product, for instance in the form of a data carrier carrying computer program code for performing embodiments herein when being loaded into the network node. One such carrier may be in the form of a CD ROM disc. It is however feasible with other data carriers such as a memory stick. The computer program code may furthermore be provided as pure program code on a server and downloaded to the network node.

Additional details on the method steps and functions performed by the network node have already been described in greater detail and therefore a repetition of the previous text is not considered necessary.

Figure 10:
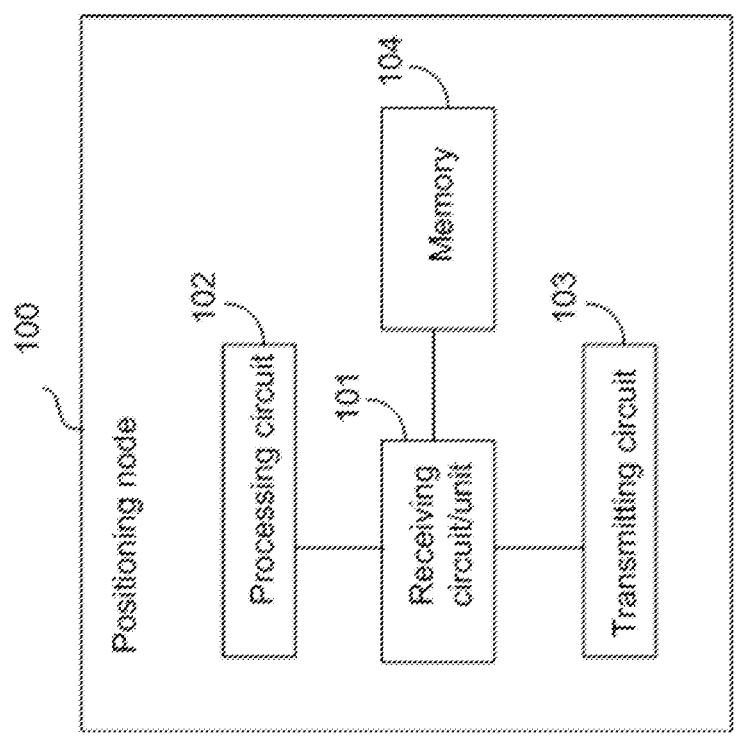
FIG. 10 illustrates a block diagram depicting a positioning node according to exemplary embodiments herein.

Referring to FIG. 10 there is illustrated a positioning node 100 for performing the method steps and embodiments described above in relation to the positioning node capable in transmitting to a UE information about PRS configuration for one or a plurality of cells operating on a TDD carrier, thereby enabling the UE to perform one or more positioning measurements. The positioning node is configured to Obtain/receive/acquire through a receiver circuitry 101 or a processing circuitry 102, from a UE a PRS configuration in one or more plurality of cells; wherein a cell is served by a network node; It is also configured to obtain/receive/acquire information from one or more network nodes about one or more flexible subframe(s) used in the one or plurality of cells; If at least one subframe containing PRS is also configured as a flexible subframe then comparing at least one parameter related to PRS transmission configuration with a threshold, The processing circuitry 102 is configured to decide based on the result of said comparison whether to include the subframe(s) configured as the flexible subframe as well as PRS subframe in the PRS configuration or not; and the node comprises a transmitting circuitry 103 configured to transmit a PRS configuration information to the UE.

The positioning may further comprise a memory 104 for storing information.

It should be mentioned that the embodiments herein may be implemented through one or more processors or processing units e.g. processing circuit or unit of the positioning node together with a computer program code for performing the functions and/or method steps of the embodiments. The program code mentioned above may also be provided as a computer program product, for instance in the form of a data carrier carrying computer program code for performing embodiments herein when being loaded into the network node. One such carrier may be in the form of a CD ROM disc. It is however feasible with other data carriers such as a memory stick. The computer program code may furthermore be provided as pure program code on a server and downloaded to the positioning node.

Additional details on the method steps and functions performed by the positioning node have already been described in greater detail and therefore a repetition of the previous text is not considered necessary.

Figure 11:
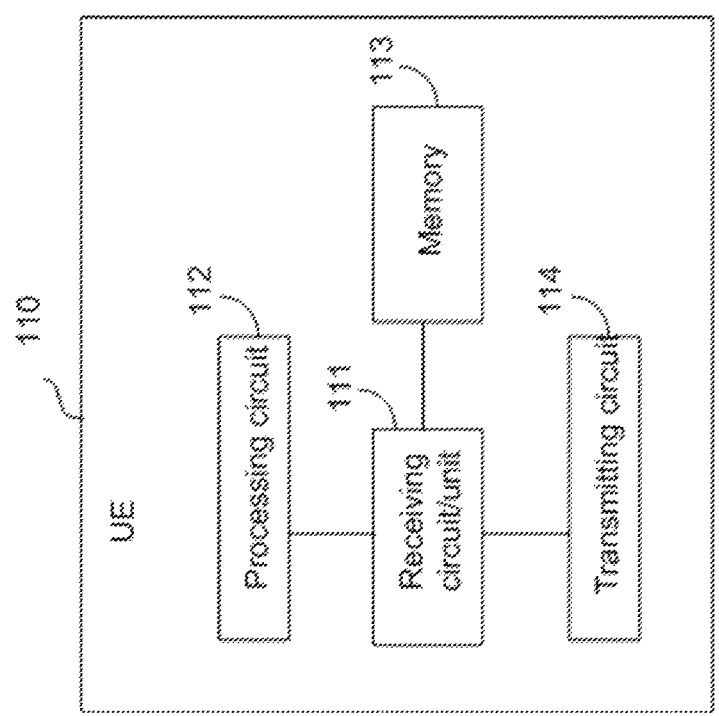
FIG. 11 illustrates a block diagram depicting a UE according to exemplary embodiments herein.

Referring to FIG. 11 there is illustrated a UE 110 for performing the method steps and embodiments described above in relation to the UE of performing positioning measurements on PRS transmitted by plurality of cells operating on a TDD carrier, the method comprises. The UE comprises a receiving circuitry 111 or a processing circuit 112 configured to obtain/receive/acquire from a positioning node a PRS configuration of PRS transmitted in plurality of cells for performing positioning measurements: The receiving circuitry 111 or a processing circuit 112 is configured to obtain/receive/acquire from a network node information about flexible subframe(s), whose direction may change dynamically in a TDD based network, is/are used in one or more cells; if at least one subframe containing PRS in at least one of the plurality of cells is also configured as a flexible subframe then the processing circuitry 112 is configured to compare at least one parameter related to the PRS transmission configuration with a threshold in the said cell served by a network node; and to determine based on the result of said comparison whether to treat the at least one subframe as flexible subframe or only as downlink subframe containing PRS transmission; and the processing circuitry 112 is configured to perform positioning measurements based on the determination.

The UE may further comprise a memory 113 for storing information and a transmitting circuit 104.

It should be mentioned that the embodiments herein may be implemented through one or more processors or processing units e.g. processing circuit or unit of the UE together with a computer program code for performing the functions and/or method steps of the embodiments. The program code mentioned above may also be provided as a computer program product, for instance in the form of a data carrier carrying computer program code for performing embodiments herein when being loaded into the network node. One such carrier may be in the form of a CD ROM disc. It is however feasible with other data carriers such as a memory stick. The computer program code may furthermore be provided as pure program code on a server and downloaded to the network node.

Additional details on the method steps and functions performed by the UE have already been described in greater detail and therefore a repetition of the previous text is not considered necessary.

Those skilled in the art will also appreciate that the various "circuits" described may refer to a combination of analog and digital circuits, and/or one or more processors configured with software and/or firmware (e.g., stored in memory) that, when executed by the one or more processors, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Throughout this disclosure, the word "comprise" or "comprising" has been used in a non-limiting sense, i.e. meaning "consist at least of". Although specific terms may be employed herein, they are used in a generic and descriptive sense only and not for purposes of limitation

ABBREVIATIONS

BS Base Station
CID Cell Identity
CRS Cell-specific Reference Signal
DL Downlink
ESS Enhanced Synchronization Signal
ID Identity
LTE Long Term Evolution
MDT Minimization of drive test
OFDM Orthogonal Frequency Division Multiplexing
OTDOA Observed Time Difference Of Arrival
PDCCH Physical Downlink Control Channel
PDSCH Physical Downlink Shared Channel
PRS Positioning Reference Signal
PSS Primary Synchronization Signal
RAT Radio Access Technology
RE Resource Element
RB Resource Block
RRM Radio Resource Management
RSRQ Reference signal received quality
RSRP Reference signal received power
SFN Single Frequency Network
SSS Secondary Synchronization Signal
UE User Equipment
UL Uplink
SON Self Organizing Network
RSSI Received signal strength indicator

LIST OF CLOSELY RELATED REFERENCES

[1] 3GPP RP-121772, "Further Enhancements to LTE TDD for DL-UL Interference Management and Traffic Adaption"
[2] 3GPP TS 36.211, v11.3.0, "Evolved Universal Terrestrial Radio Access (E-UTRA); Physical Channels and Modulation".

The invention claimed is:

1. A method performed by a network node of handling transmission of a positioning reference signal (PRS) in a network comprising a user equipment and a positioning node, the method comprising:
   determining a PRS configuration for use in a cell served by the network node;
   when at least one subframe containing said PRS is also configured as a flexible subframe;
   wherein the flexible subframe refers to a subframe whose direction can dynamically change between uplink and downlink over time,
   comparing at least one parameter related to the PRS configuration with a threshold, wherein said at least one parameter comprises a PRS periodicity, a number of PRS subframes, a number of PRS occasions, a PRS bandwidth, a transmit power of a PRS and a PRS muting configuration;
   wherein said threshold for each said at least one parameter is pre-defined or configured by another network node based on the at least one parameter related to the PRS configuration; and
   deciding based on said comparison whether to operate the at least one subframe as a flexible subframe or only as a downlink subframe containing PRS transmission;
   wherein while deciding, if a PRS muting is applied in that one or more PRS occasions are muted over a certain time period, then operating the at least one subframe as a PRS subframe if a number of PRS muting occasions is above said threshold, and otherwise operating the at least one subframe as a flexible subframe.

2. The method according to claim 1, wherein said comparing comprises, if the at least one parameter related to the PRS configuration is above said threshold, operating the at least one subframe as a PRS subframe, and otherwise operating the at least one subframe as a flexible subframe.

3. The method according to claim 1, wherein said comparing comprises, if the at least one parameter related to the PRS configuration is below said threshold, operating the at least one subframe as a PRS subframe, and otherwise operating the at least one subframe as a flexible subframe.

4. The method according to claim 1, further comprising adjusting said one or more parameter related to the PRS configuration.

5. The method according to claim 1, further comprising, informing the user equipment or another network of said decision, for enabling said user equipment or said other network node to align its PRS configuration with said PRS configuration of the network node.

6. A method performed by a positioning node configured to transmit to a user equipment (UE) information about a positioning reference signal (PRS) for one or a plurality of cells operating on a Time Division Duplex (TDD) carrier in a network comprising said UE and the positioning node and one or more network nodes, the method comprising:

obtaining from the UE a PRS configuration;
obtaining from said one or more network nodes information about one or more flexible subframes used in the network, wherein the flexible subframe refers to a subframe whose direction can dynamically change between uplink and downlink over time;
when at least one subframe containing PRS is also configured as a flexible subframe based on said PRS configuration, then
comparing at least one parameter related to the PRS configuration with a threshold, wherein said at least one parameter comprises a PRS periodicity, a number of PRS subframes, a number of PRS occasions, a PRS bandwidth, a transmit power of a PRS and a PRS muting configuration;
wherein said threshold for each said at least one parameter is pre-defined or configured by another network node based on the at least one parameter related to the PRS configuration;
deciding based on said comparison whether to include the at least one subframe configured as a flexible subframe as well as a PRS subframe in the PRS configuration;
wherein while deciding, if a PRS muting is applied in that one or more PRS occasions are muted over a certain time period, then including the at least one subframe as a PRS subframe if a number of PRS muting occasions is above said threshold, and otherwise including the at least one subframe as a flexible subframe thereby to reduce interference at the UE when the UE receives PRS from another cell; and
transmitting a PRS configuration information to the UE based on the decision.

7. The method according to claim 6, wherein the information about said one or more flexible subframes comprises an indication that certain subframes may be used as flexible subframes in certain cells or on all cells on a certain Time Division Duplex carrier.

8. The method according to claim 6, further comprising, including the PRS configuration of cells which are configured to transmit PRS subframes per PRS occasion above said threshold.

9. A method performed by a user equipment (UE) for performing positioning measurements on a positioning reference signal (PRS) transmitted by a plurality of network nodes operating on a Time Division Duplex (TDD) carrier in a network comprising at least one network node and a positioning node, the method comprising:
obtaining from said positioning node a PRS configuration;
obtaining from said at least one network node information about at least one flexible subframe; wherein the flexible subframe refers to a subframe whose direction can dynamically change between uplink and downlink over time;
when at least one subframe containing PRS is also configured as a flexible subframe based on said PRS configuration, then
comparing at least one parameter related to the PRS configuration with a threshold, wherein said at least one parameter comprises a PRS periodicity, a number of PRS subframes, a number of PRS occasions, a PRS bandwidth, a transmit power of a PRS and a PRS muting configuration;
wherein said threshold for each said at least one parameter is pre-defined or configured by another network node based on the at least one parameter related to the PRS configuration;
determining based on the comparison whether to treat the at least one subframe as a flexible subframe or as a downlink subframe containing a PRS transmission;
wherein while determining, if a PRS muting is applied in that one or more PRS occasions are muted over a certain time period, then treating the at least one subframe as a PRS subframe if a number of PRS muting occasions is above said threshold, and otherwise treating the at least one subframe as a flexible subframe thereby to reduce interference at the UE when the UE receives PRS signals from another cell; and
performing positioning measurements based on said determination.

10. The method according to claim 9, comprising obtaining Observed Time Difference Of Arrival (OTDOA) assistance information from the positioning node, which assistance information contains said PRS configuration to be used by the UE for performing the positioning measurements on said one or more cells on one or more TDD carrier.

11. The method according to claim 9, comprising using the performed positioning measurements for determining location of the UE and/or sending the positioning measurement results to the positioning node for enabling the positioning node to determine the location of the UE.

12. A network node of handling transmission of a positioning reference signal (PRS) in a network comprising a user equipment and a positioning node, the network node comprising:
a processing circuit configure to determine a PRS configuration for use in a cell served by the network node;
the processing circuit being further configured to, when at least one subframe containing said PRS is also configured as a flexible subframe; wherein the flexible subframe refers to a subframe whose direction can dynamically change between uplink and downlink over time,
compare at least one parameter related to the PRS configuration with a threshold, wherein said at least one parameter comprises a PRS periodicity, a number of PRS subframes, a number of PRS occasions, a PRS bandwidth, a transmit power of a PRS and a PRS muting configuration;
wherein said threshold for each said at least one parameter is pre-defined or configured by another network node based on the at least one parameter related to the PRS configuration; and
decide based on said comparison whether to operate the at least one subframe as a flexible subframe or as a downlink subframe;
wherein the processing circuit is configured to decide, if a PRS muting is applied in that one or more PRS occasions are muted over a certain time period, then operate the at least one subframe as a PRS subframe if a number of PRS muting occasions is above said threshold, and otherwise operate the at least one subframe as a flexible subframe.

13. The network node according to claim 12, wherein the processing circuit is configured to, if the at least one parameter related to the PRS configuration is above said threshold, operate the at least one subframe as a PRS subframe, and otherwise operate the at least one subframe as a flexible subframe.

14. The network node according to claim 12, wherein the processing circuit is configured to, if the at least one parameter related to the PRS configuration is below said threshold, operate the at least one subframe as a PRS subframe, and otherwise operate the at least one subframe as a flexible subframe.

15. The network node according to claim 12, wherein the processing circuit is further configured to adjust said one or more parameter related to PRS configuration.

16. The network node according to claim 12, wherein the processing circuit is further configured to, inform a user equipment or another network node of said decision, for enabling said user equipment or said other network node to align its PRS configuration with said PRS configuration.

17. A positioning node configured to transmit to a user equipment (UE) information about a positioning reference signal (PRS) for one or a plurality of cells operating on a Time Division Duplex (TDD) carrier in a network comprising said UE and the positioning node and one or more network nodes, the positioning node comprising:
receiver circuitry configured to obtain from the UE a PRS configuration, and to obtain from said one or more network nodes information about one or more flexible subframes used in the network; wherein the flexible subframe refers to a subframe whose direction can dynamically change between uplink and downlink over time;
processing circuitry configured to, when at least one subframe containing PRS is also configured as a flexible subframe based on said PRS configuration, compare at least one parameter related to the PRS configuration with a threshold, wherein said at least one parameter comprises a PRS periodicity, a number of PRS subframes, a number of PRS occasions, a PRS bandwidth, a transmit power of a PRS and a PRS muting configuration;
wherein said threshold for each said at least one parameter is pre-defined or configured by another network node based on the at least one parameter related to the PRS configuration;
decide based on said comparison whether or to include the at least one subframe configured as a flexible subframe as well as a PRS subframe in the PRS configuration;
wherein the processing circuitry further configured to decide, if a PRS muting is applied in that one or more PRS occasions are muted over a certain time period, then include the at least one subframe as a PRS subframe if a number of PRS muting occasions is above said threshold, and otherwise include the at least one subframe as a flexible subframe thereby to reduce interference at the UE when it receives PRS signals from another cell; and
transmit, via a transmitting circuitry included in the positioning node, a PRS configuration information to the UE based on the decision.

18. The positioning node according to claim 17, wherein the information about said one or more flexible subframes comprises an indication that certain subframes may be used as flexible subframes in certain cells or on all cells on a certain Time Division Duplex (TDD) carrier.

19. The positioning node according to claim 17, wherein the processing circuitry is configured to include the PRS configuration of cells which are configured to transmit PRS subframes per PRS occasion above said threshold.

20. A user equipment (UE) configured to perform positioning measurements on a positioning reference signal (PRS) transmitted by a plurality of network nodes operating on a Time Division Duplex (TDD) carrier in a network comprising at least one network node and a positioning node, the UE comprising:
receiving circuitry configured to obtain from said positioning node a PRS configuration, and to obtain from said at least one network node information about at least one flexible subframe; wherein the flexible subframe refers to a subframe whose direction can dynamically change between uplink and downlink over time;
processing circuitry configured to, when at least one subframe containing PRS is also configured as a flexible subframe based on said PRS configuration, compare at least one parameter related to the PRS configuration with a threshold, wherein said at least one parameter comprises a PRS periodicity, a number of PRS subframes, a number of PRS occasions, a PRS bandwidth, a transmit power of a PRS and a PRS muting configuration;
wherein said threshold for each said at least one parameter is pre-defined or configured by another network node based on the at least one parameter related to the PRS configuration;
determine based on the comparison whether to treat the at least one subframe as a flexible subframe or as a downlink subframe containing a PRS;
wherein the processing circuitry further configured to determine, if a PRS muting is applied in that one or more PRS occasions are muted over a certain time period, then treat the at least one subframe as a PRS subframe if a number of PRS muting occasions is above said threshold, and otherwise treat the at least one subframe as a flexible subframe thereby to reduce interference at the UE when it receives PRS signals from another cell; and
perform positioning measurements based on said determination.

21. The UE according to claim 20, wherein the processing circuitry is configured to obtain Observed Time Difference Of Arrival (OTDOA) assistance information from the positioning node, which assistance information contains said PRS configuration to be used by the UE for performing the positioning measurements on said one or more cells on one or more TDD carriers.

22. The UE according to claim 20, wherein the processing circuitry is configured to use the performed positioning measurements for determining location of the UE and/or sending the positioning measurement results to the positioning node for enabling the positioning node to determine the location of the UE.

* * * * *